No. 633,311. Patented Sept. 19, 1899.
H. R. GAYLORD.
FILTER.
(Application filed Jan. 6, 1899.)
(No Model.)
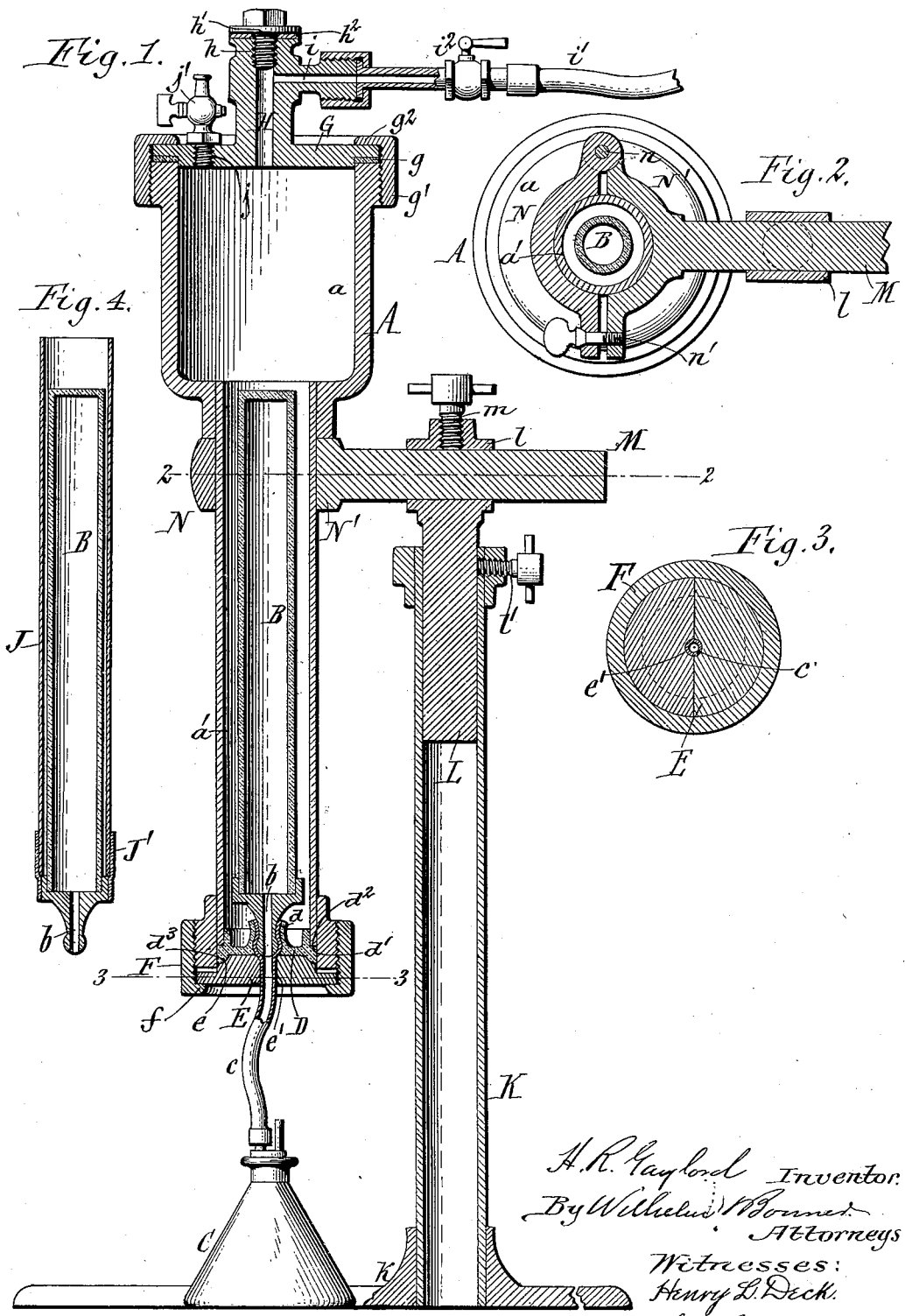

UNITED STATES PATENT OFFICE.

HARVEY R. GAYLORD, OF BUFFALO, NEW YORK, ASSIGNOR TO THE SPENCER LENS COMPANY, OF SAME PLACE.

FILTER.

SPECIFICATION forming part of Letters Patent No. 633,311, dated September 19, 1899.

Application filed January 6, 1899. Serial No. 701,314. (No model.)

*To all whom it may concern:*

Be it known that I, HARVEY R. GAYLORD, a citizen of the United States, residing at Buffalo, in the county of Erie and State of New York, have invented new and useful Improvements in Filters, of which the following is a specification.

This invention relates to a filter which is more especially designed for laboratory and scientific work—for instance, filtering serum in batches or charges through a porous tube or filtering medium under pressure.

The objects of my invention are to so construct the filter that successive batches of the liquid to be filtered can be conveniently introduced into the filter-chamber and the residue be discharged therefrom without dismembering the apparatus to a large extent, to provide the filter with convenient means for filtering a very small batch of liquid, to provide a convenient clamping device for securing the filter-tube in the filter-chamber, and to provide convenient means for supporting the filter-chamber in various positions.

In the accompanying drawings, Figure 1 is a vertical section of my improved filter, showing the position of the parts when the filter is in operation. Figs. 2 and 3 are horizontal sections in lines 2 2 and 3 3, Fig. 1, respectively. Fig. 4 is a vertical section of the filter-tube detached and provided with a surrounding tube or jacket for filtering a very small batch of liquid.

Like letters of reference refer to like parts in the several figures.

A represents the filter chamber or casing, which consists, preferably, of an upper portion $a$ and a lower portion $a'$, the upper portion being somewhat larger in diameter than the lower portion.

B represents a filter-tube or bougie of porous material arranged centrally in the lower contracted portion of the chamber. This tube is closed at its upper end and provided at its lower end with an outlet-nipple $b$ of porcelain or other suitable material. This nipple is inserted in the upper end of a rubber delivery-tube $c$, which is connected at its lower end to a receiving-flask C.

D represents a packing ring or head which connects the lower end of the filter-tube with the lower end of the filter-chamber and which is constructed of rubber or other flexible material. This head is provided with an upwardly-projecting central sleeve $d$, which is slipped over the upper end of the delivery-tube around the outlet-nipple $b$ of the filter-tube. The packing-head is provided at its periphery with an upwardly-facing annular shoulder $d'$, which bears against a downwardly-facing internal shoulder $d^2$ in the lower end of the filter-chamber. The head is firmly pressed against the chamber by a clamping-disk E, which bears against the under side of the head, and is provided with an outwardly-facing annular shoulder $e$, which bears against an internal annular shoulder $d^3$, formed on the under side of the head near the margin thereof. The clamping-disk is divided diametrically, as shown in Fig. 3, and provided with a central opening $e'$, through which the delivery-tube $c$ passes. The disk is pressed against the packing-head by a clamping screw-ring F, which engages with an external thread on the lower end of the chamber and which bears with its flange $f$ against the lower side of the marginal portion of the clamping-disk.

Before securing the filter-tube in the filter-chamber the filter-tube, the receiving-flask and the flexible tube connecting the same are sterilized by steam or otherwise. It is desirable to place these parts in a connected condition into the sterilizer, but without having the clamping-disk and clamping-ring attached thereto, because the comparatively heavy disk and ring are liable to break the filter-tube and flask and, furthermore, because the disk and ring become very hot in the sterilizer, which renders it inconvenient to assemble the parts. For this reason the orifice in the clamping-ring is made so large that the filter-tube and the flexible diaphragm can be passed through the ring, and for the same reason the clamping-disk is divided diametrically, which permits the same to be applied to the delivery-tube in assembling the parts or to be removed therefrom in separating the parts without requiring the delivery-tube to be detached either from the filter-tube or the flask. If the clamping-disk were made in one piece, it could not be removed from either end of the delivery-tube, because the opening in the disk is smaller than the parts with which the ends of the delivery-tube are connected.

The top of the filter-chamber is closed by a circular cover or head G, which rests with its marginal portion upon the upper edge of the filter-chamber, a gasket or packing-ring $g$ being interposed between the chamber and cover to produce a tight joint. The cover and chamber are firmly drawn together by a clamping screw-sleeve $g'$, having an internal flange $g^2$ at its upper end which bears against the upper side of the cover.

H represents a nozzle projecting upwardly from the center of the cover and provided with an upwardly-projecting nipple $h$ and a laterally-projecting nipple $i$. The liquid to be filtered is introduced into the filter-chamber through the upper nipple $h$. During the filtering operation the upper nipple is closed by a screw-plug $h'$, leakage being prevented by an interposed packing-ring $h^2$. The lower nipple $i$ is connected by a flexible tube or pipe $i'$ with a cylinder containing liquid carbon dioxid or some other pressure medium. Upon opening a valve $i^2$ in the pipe $i'$ the pressure medium enters the filter-chamber and acts in a well-known manner upon the liquid contained therein, forcing the liquid inwardly through the filter-tube into the space between the same, while the residue remains in the filter-chamber. The filtered liquid is conducted from the interior of the filter-tube by the delivery-tube into the receiving-flask. After a batch of serum or other liquid has been filtered the residue is removed from the filter-chamber preferably by inverting the filter-chamber, opening the lower end of the filter-chamber by removing the clamping-ring, divided clamping-disk connecting head and filter-tube, and then turning the chamber back to its upright position, when the residue will escape from the open lower end of the chamber. The pressure-pipe $i'$ remains connected with the nipple $i$ while the filter-chamber is turned for emptying and refilling the same, this movement of the chamber being permitted by the flexibility of the whole or a portion of the pressure-pipe. By thus providing an opening for filling the chamber which is separate from the pressure inlet-opening the operation of filtering successive batches is greatly facilitated.

$j$ represents a vent-opening formed in the cover of the filter-chamber. This opening serves as an exit for the air in the chamber when filling the latter, as a means of determining when the chamber is full by the overflow of the liquid through the vent-opening, and as a vent for the pressure when the operation of filtering has been completed. The vent-opening is provided with a cock $j'$, which is closed during the filtering operation and opened for relieving the filter-chamber from the pressure when desired.

When it is desired to filter a very small batch of material, the filter-tube is provided with a surrounding jacket J, Fig. 4, preferably a glass tube, of slightly-larger diameter than the filter-tube, so that a narrow annular space is left between the filter-tube and the surrounding jacket. The latter extends beyond the upper end of the filter-tube a sufficient distance to permit the liquid to be filtered to be conveniently poured into the space between the filter-tube and the jacket and to hold the desired quantity of liquid. The lower end of the jacket is conveniently supported on the shoulder formed by the collar of the discharge-nipple $b$ around the lower end of the filter-tube and is tightly connected to the nipple by a rubber sleeve J', which is applied around the collar of the nipple and the lower portion of the jacket. The latter distributes the liquid to be filtered over the outer surface of the filter-tube in a very thin layer, whereby a small quantity of liquid can be made to cover the entire surface of the filter-tube. The pressure applied to the liquid forces the same through the filter-tube in the usual way, and the distribution of the liquid over the entire surface of the filter-tube prevents any portion of the tube from being uncovered and directly exposed to the pressure medium, which would cause the pressure medium to pass through the uncovered part of the filter-tube into the delivery-pipe and flask and destroy the same.

In order to permit the filter to be conveniently placed into different positions for filling, filtering, and emptying, the filter is adjustably supported as follows:

K represents a hollow standard provided at its lower end with a supporting-base $k$.

L is a vertical rod arranged in the upper end of the standard and provided at its upper end with a horizontal sleeve $l$. This rod is capable of sliding vertically and turning horizontally in the standard and is adjustably held in position by a clamping-screw $l'$.

M is a horizontal rod which is capable of sliding horizontally and turning vertically in the sleeve of the vertical rod L and which is secured therein by a clamping-screw $m$. The front end of the horizontal rod is provided with a clamp, whereby the filter-chamber is supported and which consists of two jaws N N', which embrace the contracted lower portion of the filter-chamber near the upper enlarged portion thereof. One of the jaws is formed on the horizontal rod, while the other jaw is movably connected with the fixed jaw by a pivot $n$ and a clamping-bolt $n'$. By loosening the screw $l'$ the vertical rod can be turned horizontally or raised or lowered in the standard for adjusting the filter to suit the height of the flask. By loosening the clamping-screw $m$ the filter can be turned vertically or shifted back and forth horizontally to suit different requirements and may also be reversed, while upon opening the clamping-jaws N N' the filter-chamber can be detached from its support for thoroughly cleaning the chamber after the filtering operation has been completed.

The filter-chamber is preferably made of copper in order to retain the heat for a considerable time, thereby permitting the filtering of substances which congeal quickly and become clotty or fibrous in the absence of heat.

I claim as my invention—

1. The combination with the filter-chamber, of a filter-tube arranged therein and provided with an outlet-nipple and a delivery-tube, a flexible head connecting the filter-tube with said chamber, a divided clamping-disk bearing against the outer side of said head, and means whereby said disk is clamped against said chamber, substantially as set forth.

2. The combination with the filter-chamber, of a filter-tube arranged therein and provided with an outlet-nipple and a delivery-tube, a flexible head connecting said filter-tube with said chamber, a divided clamping-disk bearing against the outer side of said head, and a clamping-ring bearing against said disk and having a screw connection with said chamber, substantially as set forth.

3. The combination with the filter-chamber, means for placing the same under pressure, and the filter-tube arranged in said chamber, of a jacket which surrounds said tube within said chamber and is open at one end for the reception of the liquid to be filtered and which confines the liquid in a thin layer against the filter-tube, thereby enabling a charge of liquid to be filtered which is insufficient to fill the chamber, substantially as set forth.

4. The combination with the filter-chamber and means for placing the same under pressure, of a filter-tube arranged in said chamber and provided at its lower end with an outlet-nipple, a jacket for receiving the liquid to be filtered arranged around said filter-tube, open at its upper end and resting with its lower end on said outlet-nipple, and a packing-sleeve connecting said jacket with said nipple, substantially as set forth.

5. The combination with the filter-chamber, of a cover closing the end of the chamber and provided with a nozzle having a nipple for receiving the pressure medium and having a separate nipple through which the chamber may be filled and a plug for closing said filling-nipple, substantially as set forth.

6. The combination with the filter-chamber, of a supporting-standard, a rod capable of vertical and rotary adjustment on said standard, and provided above the standard with a horizontal sleeve and a horizontal rod capable of longitudinal and rotary adjustment in said sleeve and provided with a clamp which embraces the filter-chamber, substantially as set forth.

Witness my hand this 31st day of December, 1898.

HARVEY R. GAYLORD.

Witnesses:
  CARL F. GEYER,
  THEO. L. POPP.